United States Patent [19]

Ahmadi et al.

[11] Patent Number: 5,289,462
[45] Date of Patent: Feb. 22, 1994

[54] TRAFFIC MANAGEMENT IN PACKET COMMUNICATIONS NETWORKS

[75] Inventors: Hamid Ahmadi, Somers; Roch Guerin, Yorktown Heights, both of N.Y.; Levent Gun, Durham, N.C.

[73] Assignee: International Business Machines Corp., Armonk, N.Y.

[21] Appl. No.: 932,440

[22] Filed: Aug. 19, 1992

[51] Int. Cl.$^5$ .......................................... H04Q 11/04
[52] U.S. Cl. ................... 370/60.1; 370/79; 370/94.1
[58] Field of Search ............ 370/79, 60, 94.1, 17, 370/60.1

[56] References Cited

U.S. PATENT DOCUMENTS

| | | | |
|---|---|---|---|
| 4,827,411 | 5/1989 | Arrowood et al. | 364/300 |
| 4,984,264 | 1/1991 | Katsube | 370/60 X |
| 5,070,498 | 12/1991 | Kakuma et al. | 370/60 |

OTHER PUBLICATIONS

I. Cidon and I. S. Gopal, "PARIS: An Approach to Integrated High-Speed Private Networks," International Journal of Digital and Analog Cabled Systems, vol. 1, No. 2, pages 77-85, Apr.-Jun. 1988.
J. S. Turner, "New Directions in Communications (or Which Way to the Information Age)", IEEE Communications Magazine, vol. 24, No. 10, pages 8-15, Oct. 1986.
G. M. Woodruff, R. G. Rogers and P. S. Richards, "A Congestion Control Framework for High-Speed Integrated Packetized Transport," Proceeding of the IEE Globcom '88, pp. 203-207, Nov. 1988.
A. E. Echberg, Jr., D. T. Luan and D. M. Lucantoni, "Meeting the Challenge: Congestion and Flow Control Strategies for Broadband Information Transport," Proceeding of the IEEE Globcom '89, pp. 1769-1773, Mar. 1989.
I. Cidon, I. S. Gopal and R. Guerin, "Bandwidth Management and Congestion Control in plaNET," IEEE Communications Magazine, vol. 29, No. 10, pp. 54-63, Oct. 1991.
R. Guerin and L. Gun, "A Unified Approach to Bandwidth Allocation and Access Control in Fast Packet-Switched Networks," Proceedings of the IEEE Infocom '92, Florence, Italy, pp. 1-12, May 1992.

*Primary Examiner*—Benedict V. Safourek
*Assistant Examiner*—Russell W. Blum
*Attorney, Agent, or Firm*—Gerald R. Woods; Robert O. Nimtz

[57] ABSTRACT

In a packet communications network, the addition or deletion of a connection to the network by a user is governed by a link traffic metric which represents the effective capacity of each link in the network which participates in the packet connection route. The link metric is calculated in real-time and updated by simple vector addition or subtraction. Moreover, this link metric is also used to calculate leaky bucket parameters which govern the access of packets to the network once the connection is set up. A packet network using these link metrics and metric generation techniques provides maximum packet throughput while, at the same time, preserving grade of service guarantees.

18 Claims, 4 Drawing Sheets

COMMUNICATIONS NETWORK

CONNECTION REQUEST MESSAGE

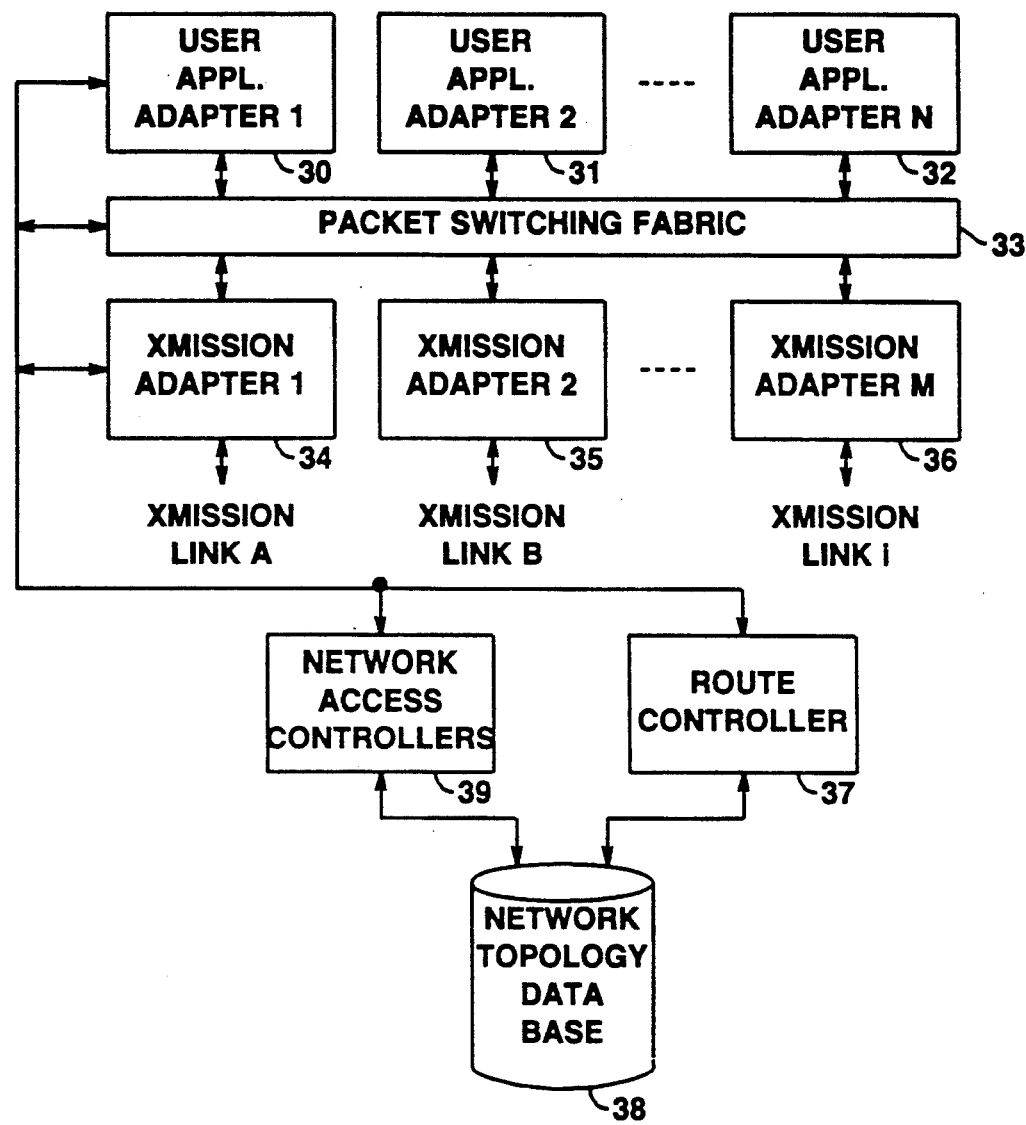

UPDATE OF LINK METRIC VECTOR

SET LEAKY BUCKET PARAMETERS

TRAFFIC MANAGEMENT IN PACKET COMMUNICATIONS NETWORKS

TECHNICAL FIELD

This invention relates to packet communications networks and, more particularly, to rapid and efficient traffic control in such networks.

BACKGROUND OF THE INVENTION

Bandwidth management in modern high speed packet communications networks operates on two different time scales which can be called "connection level controls" and "packet level controls." Connection level controls are applied at the time the connection is set up and are based on the load characteristics of the transmission links in the connection route at the time that the connection is set up. Connection level controls include bandwidth allocation, path selection and admission control and call setup. Bandwidth allocation is accomplished by noting, at the connection setup time, the "equivalent capacity" loading that the new connection will generate, based on the traffic characteristics of the source signal and the desired quality of service. Using this equivalent capacity that must be available to carry the new connection, the originating node of the network computes a path to the destination node that is capable of carrying the new connection and providing the level of service required by the new connection. This path selection utilizes data describing the current state of the traffic in the entire network. Such data can be stored in a topology data base located at each entry point, and, indeed, each node, of the network. If no suitable path can be found to meet these requirements, the connection is rejected. Once the path has been selected, the actual end-to-end setup utilizes a setup message traversing the selected route and updating the resource allocation for each link visited by the setup message. Due to race conditions, simultaneous request for setup, or unknown changes in the link resource allocation, the attempt to set up the call may fail because of the lack of necessary resources at the time the call setup message reaches a node along the route. In general, each of the end-to-end processes, i.e., initial bandwidth allocation, route selection and call setup, requires adequate network resources to carry the call and a failure at any point in any of these processes results in the call being rejected, thus preventing the launching of packets likely to cause network overload.

At the packet level, once the connection is established and the call setup procedures completed, the steady state traffic behavior is monitored to insure that the traffic behaves in accordance with the assumptions made at call setup time and that the classes of service continue to be supported by the network. Packet level controls are applied at the network access points and typically consist of a rate control mechanism and a traffic estimation module. In addition, each intermediate node implements scheduling and packet buffering strategies which enforce the necessary classes of service for the traffic in transit. The access point packet level controls, on the other hand, monitor the incoming traffic to insure that the statistical nature of the traffic assumed at call setup time continues throughout the duration of the connection, thereby preventing overload and congestion before it occurs. In many cases, it is not possible to accurately predict, a priori, the statistical parameters associated with a traffic source. Furthermore, the traffic characteristics of a source may change substantially over time. It is therefore important to have the ability to estimate the traffic flow and to react dynamically to changes in the characteristics of the traffic on a connection.

It is essential to successful traffic management and a congestion free network that the proper interrelationship between connection level controls and packet level controls be preserved at all times. That is, the parameters of the connection level controls must be set so as to allow the desired packet level controls to operate appropriately. Similarly, the packet level control functions must be made consistent with the call setup allocations. Prior art approaches to this problem are described in "New Directions in Communications (or Which Way to the Information Age)", by J. S. Turner, *IEEE Communications Magazine*, Vol. 24, No. 10, pages 8–15, October 1986, "A Congestion Control Framework for High-Speed Integrated Packetized Transport," by G. M. Woodruff, R. G. H. Rogers and P. S. Richards, *Proceedings of the IEEE Globcom '88*, pages 203–207, November 1988, "PARIS: An Approach to Integrated High-Speed Private Networks," by I. Cidon and I. S. Gopal, *Internation Journal of Digital and Analog Cabled Systems*, Vol. 1, No. 2, pages 77–85, April–June 1988, "Meeting the Challenge: Congestion and Flow Control Strategies for Broadband Information Transport," by A. E. Echberg, Jr., D. T. Luan and D. M. Lucantoni, *Proceedings of the IEEE Globcom '89*, pages 1769–1773, March 1989, "Bandwidth Management and Congestion Control in plaNET," by I. Cidon, I. S. Gopal and R. Guérin, *IEEE Communications Magazine*, Vol. 29, No. 10, pages 54–63, October 1991, and "A Unified Approach to Bandwidth Allocation and Access Control in Fast Packet-Switched Networks," by R. Guérin and L. Gün, *Proceedings of the IEEE Infocom '92*, Florence, Italy, pages 1–12, May 1992.

In order to accommodate connections in a packet communications network for data streams with widely different characteristics, it is important to allocate bandwidth for each connection with a metric which is readily computable, easily updated and capable of capturing all of the significant characteristics of the highly diversified traffic. Moreover, this metric must also be used to characterize the accumulated transmission link traffic load due to all of the individual connections on that link. An easily calculated metric to characterize traffic on a network is a critical factor for efficient traffic control in the network. Another critical factor is the mapping of this metric into a packet level mechanism such as the "leaky bucket" type of packet control.

More specifically, a leaky bucket form of packet level access control requires the achievement of two general objectives. First, the scheme must be transparent as long as the traffic stays within the setup values, allowing immediate access to the network. Secondly, however, the leaky bucket scheme must control the maximum bandwidth taken by the user source when the source increases its traffic beyond the setup values, at least until a new bandwidth can be negotiated. The leaky bucket control mechanism operates as described below.

Tokens are generated at a fixed rate and delivered to a token pool of a fixed size. Packets are allowed to enter the network only if the number of available tokens in the token pool will accommodate the packet. Assuming, for example, that each token gives permission for the transmission of one bit of information, then a packet can enter the network only if the number of available tokens is larger than the number of bits in the packet. After each packet is launched into the network, the number of available tokens in the pool is decremented by the number of bits in the packet. Ideally, the token accumulation rate is equal to the long term average rate for this traffic while the pool size is a function of the burstiness of the traffic. Both the token rate and the pool size are chosen to achieve transparency of the leaky bucket for well-behaved user traffic, where the average rate and burstiness are as expected. The peak rate at which packets can enter the network, however, is controlled by the use of a spacer at regular intervals in the packet traffic which limit the maximum rate at which packets can be injected into the network. One such use of spacers is described in the afore-mentioned *Infocom '92* article of the present applicants. In general, this maximum rate is equal to the peak rate of the traffic, but can be tuned to achieve any desired trade-off between the smoothing of the user traffic (at the cost of increased access delay) and the amount of bandwidth reserved for that traffic.

In general, the constraint of transparency requires that the token rate be greater than the average traffic rate to account for the burstiness of the input traffic. The value of the token rate then determines the worst case average rate at which the user traffic can enter the network. More particularly, when the user average input rate increases beyond the token rate, the leaky bucket will saturate, causing the token pool to be always empty. Packets can therefore only enter the network as fast as tokens are generated. The output of the leaky bucket then appears like a constant bit stream at an average rate equal to the token rate. In order to ensure that this increased average load going into the network does not create congestion, the token rate should be no greater than the bandwidth reserved for that connection in the links. Once this token rate is determined, the size of the token pool can be chosen to achieve reasonable transparency to the user of the leaky bucket. A difficult problem is the determination of these leaky bucket parameters for each connection to achieve both transparency and maximum bandwidth control and, at the same time, the computation of these parameters sufficiently quickly to permit dynamic, realtime packet level control of network traffic.

SUMMARY OF THE INVENTION

In accordance with the illustrative embodiment of the present invention, the new connections are added or denied in a packet communications network by minimal computations which can be carried out in real-time as the connection route is being setup. More particularly, a request for a connection specifies a link metric vector for each link in the connection. Using statistical multiplexing techniques, the capacity of each link in a proposed route is examined to determine if the new connection can be handled on a statistical basis. That is, if all connections on the link were operating at the statistical mean parameters predicted for those connections, the link would be capable of handling all of the connections. Such statistical multiplexing depends, of course, upon a sufficient number of such connection on a link to insure the overall statistical behavior of the composite signals. That is, given each link's metric vector, the validity of the statistical multiplexing assumption that a "large" number of similar connections share the link is checked. Depending on the validity of the statistical multiplexing assumption, the new link metric for the link with the new connection is the simple vector addition (or subtraction, for disconnect requests) of the connection link vector (if the assumption is valid) or the vector addition (or subtraction) of a link metric vector which assumes that the new traffic is a constant bit rate connection (if the assumption is not valid). These link metric values are, of course, dependent on the enforcement of an access control mechanism that enforces these values.

The above algorithm for computing link metrics can be made computationally efficient, allowing for real-time updates of the link metric vectors while, at the same time, accounting for the actual relationship between the link bandwidth and the connection characteristics. This algorithm also preserves the incremental nature of the link metric updates so that information on the individual connections need not be maintained in the network topology data base.

In practice, a connection request message with the metrics for the new connection is propagated along the proposed route for the connection. At each switching point along the route, the metric in the request message is used to update the link metric for the next leg of the route. When all links on the route have been updated, and the new connection in the request has been accepted for all of the links in the connection, information messages can be transmitted along this route.

While this connection request message is being processed along the connection path, the leaky bucket parameters can be computed to control the access of the new packet source to the network at the originating node. More particularly, an initial estimate of the token rate for each link is taken equal to the equivalent bandwidth for the new connection if the statistical multiplexing assumption cannot be validated on that link (i.e., if a sufficiently large number of connections of this type cannot be supported on this link), or is taken equal to the minimum of the equivalent capacities on this link if the assumption can be validated. This available bandwidth is called the "reservable bandwidth" for the link and is equal to some high fraction of the physical bandwidth, leaving a margin for error in the statistical multiplexing algorithm. The actual token rate used for controlling access of the new connection to the network is the minimum, over all links, of these initial estimates, i.e., the lowest bandwidth requirement estimate for the new connection on all of the links of the connection path.

Once the token rate is determined, then the token pool size is calculated to keep the probability of running out of tokens below any desired probability. The leaky bucket parameters thus determined can be adjusted if the input traffic parameters are smoothed by the action of a spacer limiting traffic access to the network and can be dynamically updated if the traffic estimation component detects significant changes in the statistical behavior of the incoming traffic.

It can be seen that, in accordance with the present invention, the bandwidth reservation algorithm and the leaky bucket access control mechanism are calculated from the same traffic-qualifying parameters and hence permit fully consistent regulation of traffic flow. Such consistent traffic regulation, in turn, ensures that congestion will not arise in the communications network and that traffic will flow freely.

BRIEF DESCRIPTION OF THE DRAWINGS

A complete understanding of the present invention may be gained by considering the following detailed description in conjunction with the accompanying drawings, in which:

FIG. 3 shows a more detailed block diagram of typical decision point in the network of FIG. 1 at which packets may enter the network or be forwarded along the route to a destination for that packet;

FIG. 4 shows in tabular form a portion of the topology data base at each decision point such as that shown in FIG. 3 which is used to support bandwidth reservation and packet access control at that decision point;

To facilitate reader understanding, identical reference numerals are used to designate elements common to the figures.

DETAILED DESCRIPTION

Figure 1:
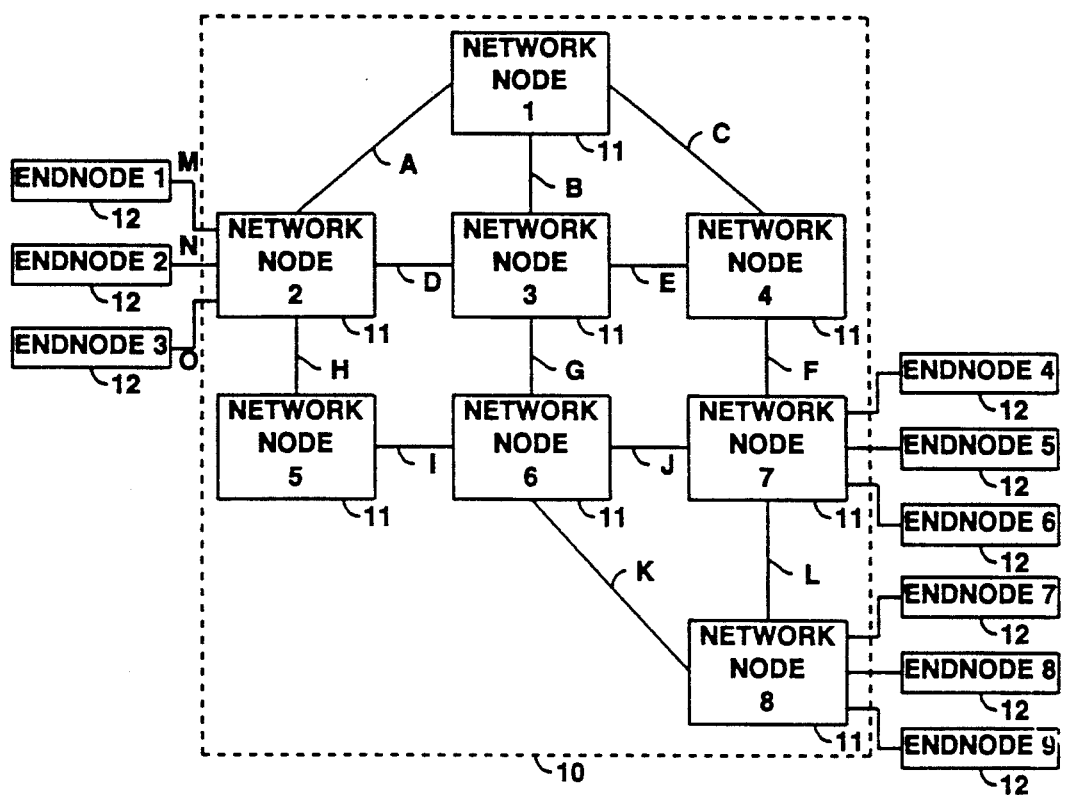
FIG. 1 shows a general block diagram of a packet communications system in which the link metrics and leaky bucket parameters determined in accordance with the present invention might find use.

Referring more particularly to FIG. 1, there is shown a general block diagram of a packet transmission system 10 comprising eight network nodes 11 numbered 1 through 8. Each of network nodes 11 is linked to others of the network nodes 11 by one or more communication links A through L. Each such communication link may be either a permanent connection or a selectively enabled (dial-up) connection. Any or all of network nodes 11 may be attached to end nodes, network node 2 being shown as attached to end nodes 1, 2 and 3, network node 7 being shown as attached to end nodes 4, 5 and 6, and network node 8 being shown as attached to end nodes 7, 8 and 9. Network nodes 11 each comprise a data processing system which provides data communications services to all connected nodes, network nodes and end nodes, as well as decision points within the node. The network nodes 11 each comprise one or more decision points within the node, at which incoming data packets are selectively routed on one or more of the outgoing communication links terminated within that node or at another node. Such routing decisions are made in response to information in the header of the data packet. The network node also provides ancillary services such as the calculation of routes or paths between terminal nodes, providing access control to packets entering the network at that node, and providing directory services and maintenance of network topology data bases used to support route calculations.

Each of end nodes 12 comprises either a source of digital data to be transmitted to another end node, a utilization device for consuming digital data received from another end node, or both. Users of the packet communications network 10 of FIG. 1 utilize an end node device 12 connected to the local network node 11 for access to the packet network 10. The local network node 11 translates the user's data into packets formatted appropriately for transmission on the packet network of FIG. 1 and generates the header which is used to route the packets through the network 10.

In order to transmit packets on the network of FIG. 1, it is necessary to calculate a feasible path or route through the network from the source node to the destination node for the transmission of such packets. To avoid overload on any of the links on this route, the route is calculated in accordance with an algorithm that insures that adequate bandwidth is available for the new connection. One such algorithm is disclosed in the copending application Ser. No. 07/874,917, filed Apr. 28, 1992, now U.S. Pat. No. 5,233,604, and assigned to applicants' assignee. Once such a route is calculated, a connection request message is launched on the network, following the computed route and updating the bandwidth occupancy of each link along the route to reflect the new connection. One such connection request message is shown in FIG. 2.

Figure 2:
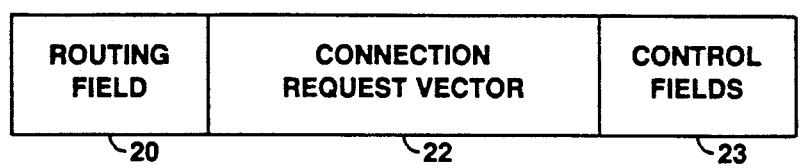
FIG. 2 shows a graphical representation of a connection request message for setting up bandwidth reservations along the route of data packets which might be transmitted on the packet communications network of FIG. 1.

In FIG. 2 there is shown a graphical representation of a connection request message to be launched from a source node in the network of FIG. 1 to a destination node in the network along a precalculated route. The connection message of FIG. 2 comprises a routing field 20 which includes the information necessary to transmit the connection message along the precalculated route. Also included in the connection request message of FIG. 2 is a connection request vector 22 which characterizes the important statistical characteristics of the new packet source and which allows this new source to be statistically multiplexed with the previously existing signals on each link of the route. As will be discussed in detail hereinafter, this connection request vector includes the mean of the aggregate bit rate for the source, the variance of that bit rate from that mean, and the equivalent bandwidth required for the new connection. The values in this connection request vector will be used to test each link of the route to determine if the new connection will actually be supported by the links, and to update, separately for each link, the link occupancy metric to reflect the addition of the new connection. If the link occupancy has changed since the route was calculated, the connection may be rejected at any node along the route, and the source node notified of the rejection. Finally, the control fields 23 include additional information used in establishing the connection, but which are not pertinent to the present invention and will not be further discussed here. Note that, when a connection is to be taken down, a connection removal message having the same format as FIG. 2 is transmitted along the route of the connection to be removed. The link occupancy is then updated to reflect the removal of this connection by subtracting the metrics for the removed connection.

In FIG. 3 there is shown a general block diagram of a typical packet network decision point such as is found in the network nodes 11 of FIG.1. The decision point of FIG. 3 comprises a high speed packet switching fabric 33 onto which packets arriving at the decision point are entered. Such packets arrive over transmission links via transmission adapters 34, 35, ..., 36, or originate in user applications in end nodes via application adapters 30, 31, ..., 32. It should be noted that one or more of the transmission adapters 34-36 can be connected to intranode transmission links connected to yet other packet switching fabrics similar to fabric 33, thereby expanding the switching capacity of the node. The decision point of FIG. 3 thus serves to connect the packets arriving at the decision point to a local user (for end nodes) or to a transmission link leaving the decision point (for network nodes and end nodes). The adapters 30-32 and 34-36 may include queuing circuits for queuing packets prior to or subsequent to switching on fabric 33. A route controller 37 is used to calculate optimum routes through the network for packets originating at one of the user application adapters 30-32 in the decision point of FIG. 3. Network access controllers 39, one for each connection originating at the decision point of FIG. 3, are used to regulate the launching of packets onto the network if the transient rate of any connection exceeds the values assumed in making the original connection. Both route controller 37 and access controllers 39 utilize the link metric vector for the new connection in calculating routes or controlling access. In addition, controller 37 utilizes link metric vectors representing the traffic on each link of the network, stored in topology data base 38, to calculate the connection route through the network. Network topology data base 38 contains information about all of the nodes and transmission links of the network of FIG. 1 which information is necessary for controller 37 to operate properly.

The controllers 37 and 39 of FIG. 3 may comprise discrete digital circuitry or may preferably comprise properly programmed digital computer circuits. Such a programmed computer can be used to generate headers for packets originating at user applications in the decision point of FIG. 3 or connected directly thereto. Similarly, the computer can also be used to calculate feasible routes for new connections and to calculate the necessary controls to regulate access to the network in order to prevent congestion. The information in data base 38 is updated when each new link is activated, new nodes are added to the network, when links or nodes are dropped from the network or when link loads change due to the addition of new connections. Such information originates at the network node to which the resources are attached and is exchanged with all other nodes to assure up-to-date topological information needed for route and access control calculations. Such data can be carried throughout the network on packets very similar to the information packets exchanged between end users of the network.

The incoming transmission links to the packet decision point of FIG. 3 may comprise links from local end nodes such as end nodes 12 of FIG. 1, or links from adjacent network nodes 11 of FIG. 1. In any case, the decision point of FIG. 3 operates in the same fashion to receive each data packet and forward it on to another local or remote decision point as dictated by the information in the packet header. The packet network of FIG. 1 thus operates to enable communication between any two end nodes of FIG. 1 without dedicating any transmission or node facilities to that communication path except for the duration of a single packet. In this way, the utilization of the communication facilities of the packet network is optimized to carry significantly more traffic than would be possible with dedicated transmission links for each communication path.

In FIG. 4 there is shown in tabular form a portion of the information stored in the data base 38 of FIG. 3. As can be seen in FIG. 4, a link metric vector for each link of the network is stored in the data base. In accordance with the present invention, the link metric vectors are calculated as will be described below. As will also be described hereinafter, these link metric vectors are updated with the addition or deletion of each virtual connection through the network, and adjusted to reflect physical changes in the network. The use of the link metric vectors for call requests and access control will be described in connection with FIGS. 5 and 6, respectively.

In broadband, integrated, packet-switched networks of the form shown in FIG. 1, connections with possibly widely different characteristics (e.g., peak rate, utilization, burst size) are allowed to share network links. However, despite these differences, it is necessary to identify on each network link the current load level or total bandwidth allocated to existing connections. This is achieved through the definition of a link metric vector from which the load level on a link can easily be obtained. The load metric vector accounts for the characteristics of individual connections, while capturing the effect of aggregating many connections with different characteristics. In accordance with the present invention, the link metric vector $L_{kl}$ for link kl is obtained from the characteristics of all of the connections routed over the link, and is given by $$L_{kl} = \left( m = \sum_{i=1}^{N} m_i,\ \sigma^2 = \sum_{i=1}^{N} \sigma_i^2,\ \hat{C}^{(N)} = \sum_{i=1}^{N} \hat{c}_i \right) \quad (1)$$

where N is the number of network connections currently multiplexed on link kl, m is mean of the aggregate bit rate of the connected source, $\sigma^2$ is the variance of the aggregate bit rate and $C^{(N)}$ is the sum of the N individual equivalent bandwidth capacities as given by $$\hat{c}_{j,kl} = R_j \left( \frac{y_{j,kl} - X_{kl} + \sqrt{[y_{j,kl} - X_{kl}]^2 + 4X_{kl}\rho_j y_{j,kl}}}{2y_{j,kl}} \right) \quad (2)$$

where $X_{kl}$ is the amount of buffer space, $y_{j,kl} = \ln(1/\epsilon_{kl})b_j(1-\rho_j)R_j$, where $\epsilon_{kl}$ is the desired buffer overflow probability for link kl, and $\rho_j = m_j/R_j$ is the probability that connection j is active (i.e., in the burst state). $R_j$ is the peak input rate for the new connection j. In general, $X_{kl}$ may represent the physical storage capacity of the link, or it may represent a desired delay objective on this link. For example, the queuing delay objective may be less than $X_{kl}/C_{kl}$ with a probability of $(1-\epsilon_{kl})$, where $C_{kl}$ is the transmission capacity of the link.

This equivalent capacity $\hat{c}_{j,kl}$ captures the effect of connection characteristics for a connection in isolation. The following approximation for the link bandwidth $\hat{C}_{kl}$ allocated to the aggregation of N connections on link kl accounts for both the effect of statistical multiplexing and the impact of individual connection characteristics:

$$\hat{C}_{kl} = \min\{m + \alpha'\sigma,\ \hat{C}^{(N)}\} \quad (3)$$

where, for a buffer overflow probability of $\epsilon$, $\alpha'$ is a constant equal to $$\alpha' \approx \sqrt{2 \ln \frac{1}{\epsilon} - \ln 2\pi} . \tag{4}$$

As connections are added or removed, the link metric vector $L_{kl}$ must be updated to reflect the change in loading. Such updates depend not only on the characteristics of the connection added or removed, but also on the relationship of this connection to the total capacity of the link. This relationship is of great importance because it determines, in part, the amount of bandwidth that needs to be reserved for the connection. For example, the amount of bandwidth required for a ten megabit connection may be different on a 45 megabit link than it is on a one gigabit link. This difference has its roots in the use of a statistical multiplexing approximation in the first term of equation (3). This statistical multiplexing assumption holds true only for links which are capable of supporting a large number of connections similar to the one being added or removed. The validity of this assumption must therefore be checked in order to properly update the link metric vector. However, in order to permit real time computation, this check should involve as limited computations as possible. The present invention utilizes a simple algorithm to perform this check and then update the link metric vectors, based on this check, as connections are added or removed from the link.

In further accordance with the present invention, the update of a link metric vector proceeds as follows: Each new connection request is accompanied by bandwidth request vector $r_{N+1}$ characterizing the bandwidth requirements of the connection, where the request vector is of the form $$r_{N+1} = (m_{N+1}, \sigma^2_{N+1}, \hat{c}_{N+1}) \tag{5}$$

where $m_{N+1}$ and $\sigma_{N+1}^2$ are the mean and variance of the connection bit rate and $c_{N+1}$ is the equivalent bandwidth of the connection in isolation as, given by equation (2). This equivalent bandwidth can itself be a vector, one element for each link of the route, if the links along the selected route have different characteristics, such as buffer size. For simplicity, it will be assumed that the request vector is the same for all links. The modifications necessary to accommodate multiple request vectors will be obvious to those skilled in the art.

As the connection request message propagates along the computed connection path, it is copied in each of the nodes by the route controller 37 (FIG. 3) responsible for managing the bandwidth of the links connected to the node. In this connection, note that a disconnect is simply a negative reservation for the amount of bandwidth originally reserved for the connection. Using the bandwidth reservation vector, the route controller 37 must update the link metric vector in topology data base 38 for the link used in the computed connection path and, if the connection is being added, derive the new link load to decide whether the connection should be accepted or rejected. The proper update of the link metric vector requires that two operations be performed for each link. First, the number of connections with a request vector $r_j$ that could be statistically multiplexed on link kl is computed and compared to the number needed to satisfy the statistical multiplexing assumption. More specifically, the statistical multiplexing assumption used in equation (3) requires that the link be capable of supporting "many" connections similar to the one being added or removed. For any given type of connection, this assumption depends on both the connection characteristics and the total link bandwidth since high bandwidth links can fit more connections, resulting in a greater accuracy of the statistical multiplexing assumption. Once the validity of this assumption has been checked, the request vector to actually be used in updating the link metric can be selected and used to compute the new link metric vector.

Upon receipt of the request vector $r_j$ for link kl, the value of the maximum number Nj,kl of connections with that request vector which could fit on link kl, is given by $$N_{j,kl} = \max\{n; \; nm_j + \alpha' \sqrt{n} \; \sigma_j \leq R_{kl}\}. \tag{6}$$

where $R_{kl}$ is the maximum reservable capacity on link kl, and n is an arbitrary dummy variable taking on successive values only in order to define $N_{j,kl}$. Based on whether Nj,kl is greater or smaller than a given minimum value N*, the new link metric vector $L'_{kl}$ is computed. The value of N* should be "large" to approximate the aggregate bit rate distribution necessary to validate the statistical multiplexing assumption. However, since the stationary approximation bandwidth capacity approximation represented by the mean in the first term on the right hand side of equation (3) ignores buffers, the bandwidth capacities are all on the high side and a reasonable error margin can be tolerated. If the statistical distribution of the link metric vector values is assumed to be Gaussian, a value of N* of 10 connections is adequate to insure reasonable accuracy in many circumstances. If there is little or no buffering in the intermediate nodes, a larger number for N* may be needed. In any event, using a heuristically determined value for N*, the new link metric vector $L'_{kl}$ is computed as follows:

$$L'_{kl} = \begin{cases} L_{kl} + r_j, & \text{if } N_{j,kl} \geq N^* \\ L_{kl} + \bar{r}_j, & \text{if } N_{j,kl} < N^* \end{cases} \tag{7}$$

where addition is component-wise and where $\bar{r}_j$ is a modified request vector for those links where the statistical multiplexing assumption does not hold true, and is given by:

$$\bar{r}_j = (\hat{c}_j, 0, \hat{c}_j) \tag{8}$$

It can be seen that equation (8) simply states that the network connections for which the statistical multiplexing assumption does not hold true are treated as constant bit rate connections ($\sigma_j^2 = 0$) with a rate equal to their equivalent capacity as given by equation (2).

The new allocated equivalent bandwidth is easily computed from the updated link metric vector $L'_{kl}$, using equation (3). When the bandwidth allocated to a network connection is released, the procedure is similar, but subtraction is used in equation (7) instead of addition. These computations can be performed so as to minimize the amount of computation required, essentially by avoiding the costly computation of Nj,kl. This procedure is carried out as follows, using equation (6):
1. Upon receipt of a request vector $r_j$ for link kl, check the validity of the "large" number of connections assumption for statistical multiplexing (i.e., $N_{j,kl} < N^*$). This is accomplished without computing $N_{j,kl}$ as follows:

Compute $t_1 = R_{kl} - N^* m_j$. This calculation is to determine the amount of the maximum reservable capacity on link kl ($R_{kl}$) remaining after carrying the minimum number ($N^*$) of connections, each having the same mean bit rate as the new connection ($m_j$), necessary to support the statistical multiplexing assumption.

If $t_1 \leq 0$, that is, if the link cannot carry $N^*$ of such connections, then obtain vector $\bar{r}_j$ from equation (8). The link is incapable of carrying the minimum number of connections to warrant the statistical multiplexing assumption, and a constant bit rate bandwidth estimate ($r_j$) is used instead of the equivalent bandwidth estimate for statistical multiplexing in the request vector ($r_j$).

Else, compute $t_2 = \alpha'^2 N^* \sigma_j^2$. That is, even if the link will support the mean bit rate of $N^*$ connections, will there be enough bandwidth left over to also support the standard deviations for such connections.

If $t_2 \geq (t_1)^2$, then obtain $\bar{r}_j$ from equation (8). That is, if the link cannot also carry the standard deviations for the $N^*$ connections, use the constant bit rate bandwidth $\bar{r}_j$.

Else, use $\tilde{r}_j$. If the link will carry both the mean bit rate for the minimum connections and also the standard deviations for the minimum connections, then use the request vector in the request message.

2. If the request is for a connection removal, set $\bar{r}_j = -\bar{r}_j$ (or $\tilde{r}_j = -\tilde{r}_j$).

3. Compute a new link metric vector $L'_{kl}$ from equation (7), using simple vector addition.

This algorithm provides an efficient procedure to update link metric vectors, requiring at most four additions, three multiplications and two comparisons. This efficiency allows for real-time updates while accounting for the relationship between link bandwidth and connection characteristics and preserving the incremental nature of link metric updates so that information on individual connections need not be maintained.

Figure 5:
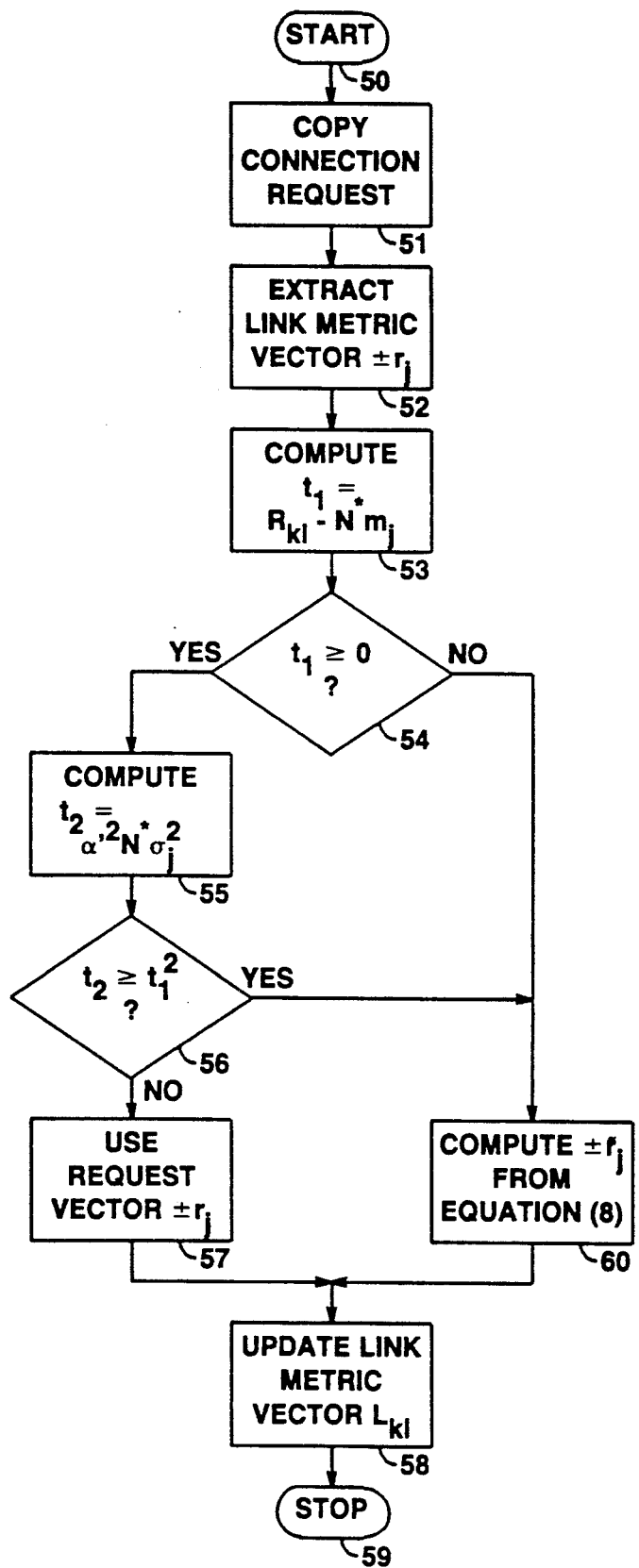
FIG. 5 shows a general flow chart of the process for updating a link metric vector when a new connection is established.

A flow chart of the algorithm implementing the above procedure for use at each node in the path of a new connection and visited by the connection request message of FIG. 2 is shown in FIG. 5. Starting at start box 50, box 51 is entered where the connection request message is copied at the node along the route. In box 52, the request vector $r_j$ is extracted from the connection request message and used, in box 53, to compute the value of $t_1$. In decision box 54, the value of $t_1$ is compared to zero and, if equal to or greater than zero, box 55 is entered where the value of $t_2$ is calculated. In decision box 56, the value of $t_2$ is compared to the square of the value of $t_1$. If $t_2$ is less than $t_1$ squared, box 57 is entered where the incremental vector is set to be equal to the request vector $r_j$ received with the connection request message. If, however, $t_2$ is equal to or greater than the square of $t_1$, box 60 is entered where the incremental vector is set to be equal to $\bar{r}_j$, using equation (8). If the value of $t_1$ is less than zero, as determined in box 54, box 60 is also entered to set the incremental vector to the value of $\bar{r}_j$. In either case, the incremental vector is used in box 58 to update the link metric vector for this link by simple component-wise vector addition. The process stops in box 59.

Note that the process described in the flow chart of FIG. 5 is carried out at each of the nodes along the route selected for the transmission of packets from the source node to the destination node. The capacity to carry out this link metric updating process is therefore resident in all of the nodes of the network of FIG. 1 and invoked each time a connection request message is received at that node. Also note that equation (6) is not solved directly in the procedure of FIG. 5, thereby avoiding a very significant time delay in vector updating.

In further accord with the present invention, the link metrics defined above are also used in calculating the parameters of a leaky bucket scheme to control access to the network. The leaky bucket mechanism can be explained as follows: Tokens are generated at a fixed rate $\gamma$ and delivered to a token pool having a size of M tokens. A packet is allowed to enter the network only if a sufficient number of tokens are in the pool to accommodate the length of the packet. For example, if each token is worth one binary bit, then a packet is transmitted only if the number of tokens in the pool exceeds the bit length of the packet. Once a packet is launched, the token pool is reduced in size by the number of tokens in the packet. Ideally, the factor $\gamma$ represents the long term bandwidth allocated to the packet connection in the network while M accommodates the burstiness of the user traffic. Both parameters are chosen to achieve transparency of the leaky bucket access control to the user, as long as the traffic remains within the negotiated values, and to control the maximum bandwidth taken by the traffic when that traffic exceeds the negotiated values.

As noted above, the token generation rate $\gamma$ should ideally correspond to the amount of bandwidth reserved for this connection on the network links. As can be seen from equation (3), however, the contribution of any connection to the total amount of bandwidth reserved depends on the other connections multiplexed on the link as well that connection itself. Furthermore, the constraint introduced in equation (7) by the parameter $N^*$ further complicates the computation of the leaky bucket parameters. Even if it were possible to keep track over time of the number of connections and of their contributions to the bandwidth reserved on a link, it is not feasible to propagate this information back to the entry point for all of the connections sharing the link and to update the leaky bucket parameters each time a new connection is added or removed from a link.

In further accord with the illustrative embodiment of the present invention, a practical method for determining the leaky bucket parameters is provided so that both transparency and bandwidth limiting are accommodated. In particular, for each link in the proposed route, if the maximum number of connections which can be multiplexed on the link as given by equation (6) is less than the given minimum value $N^*$, thus failing to satisfy the statistical multiplexing assumption, then the estimated token rate for that link is simply equal to the bandwidth allocated to the multiplexed connection on that link, i.e., the estimated token rate is equal to the equivalent bandwidth for that link as computed from equation (2). If, on the other hand, the statistical multiplexing assumption is satisfied because a sufficient number of similar connections can be multiplexed on that link of the route, then the estimated token rate for that link is taken equal to $$a_{j,kl} = \frac{R_{kl}}{N_{j,kl}}. \tag{9}$$

assuming that $a_{j,kl}$ is less than $\hat{c}_{j,kl}$ computed from equation (2), where $R_{kl}$ in equation (9) is the maximum reservable capacity on link kl and $N_{j,kl}$ is determined from equation (6). That is, all connections are assumed to occupy equal bandwidths on that link, since they all have identical characteristics, and the estimated token rate for that link is equal to one of these prorated bandwidths. The number of such connections $N_{j,kl}$ is given by $$N_{j,kl} = \left\{ \frac{-\alpha'\sigma_j + \sqrt{\alpha'^2\sigma_j^2 + 4m_j R_{kl}}}{2m_j} \right\}^2 \tag{10}$$

where $\alpha'$ is defined in equation (4), $\sigma_j$ is the standard deviation of the aggregate bit rate of a signal source having a mean bit rate of $m_j$.

Based on the above description, the estimated token rate for each link in the proposed path for the connection is given by $$\gamma_{j,kl} = \begin{cases} \min\{\hat{c}_{j,kl}, a_{j,kl}\} & \text{if } N_{j,kl} > N^* \\ \hat{c}_{j,kl} & \text{otherwise} \end{cases} \tag{11}$$

The actual token generation rate used at the input node to the network for the connection is the minimum of the estimated token rates for all of the links in the connection path. That is, the access control token rate is given by $$\gamma_j = \min_{kl} \{\gamma_{j,kl}\}. \tag{12}$$

This choice of $\gamma_j$ guarantees that, even in a non-homogeneous environment, all of the links in the network are protected against overload. For a proof of this guarantee, see the above-identified *Infocom '92* article by the present applicants. That is, even if all of the connections on any given link start to send traffic at an average rate of $\gamma_j$, the total load on the link will remain below the total bandwidth $C_{kl}$ allocated on that link, as given by equation (3).

Once the token rate $\gamma_j$ is determined, the value of M can be chosen such that, for given traffic with characteristics (R, b, $\rho$), the probability of running out of tokens and thus delaying or reducing the priority of a packet is kept below any desired probability $\xi$, where R is the peak input rate, b is the average duration of a burst period of the input and $\rho$ is probability that the input is in the burst state. To achieve this result, the size M of the token pool is computed from $$M = \frac{b(1-\rho)\gamma(R-\gamma)}{\gamma - \rho R} \times \ln\left( \frac{\rho(\gamma - \rho R) + \rho\xi(R-\gamma)}{\xi\gamma(1-\rho)} \right) \tag{13}$$

using the concept of duality between buffer space and token pool size, that is, by equating the probability of an empty token pool with the probability of a queue greater than M.

A flow chart implementing the procedure for selecting the leaky bucket parameters described above is shown in FIG. 6. Recall that the leaky bucket is used at the source node to control the access of the source traffic to the network depending not only on the statistics of the source traffic, but also on the characteristics of the links along the path of the connection. These leaky bucket parameters are, therefore, based on traffic data already available at the source node in the topology data base 38 (FIG. 3) as shown in FIG. 4. In general, the reservable link capacities for those links in the connection path are used to determine the required token rate $\gamma$ for each link on the route. The source node then uses the smallest of these values of $\gamma$ to insure that no link suffers congestion. The pool size M is then determined so as to keep the likelyhood of delaying a packet below some preselected, low probability. The procedure uses computations very similar to those used in the update process of FIG. 5.

Figure 6:
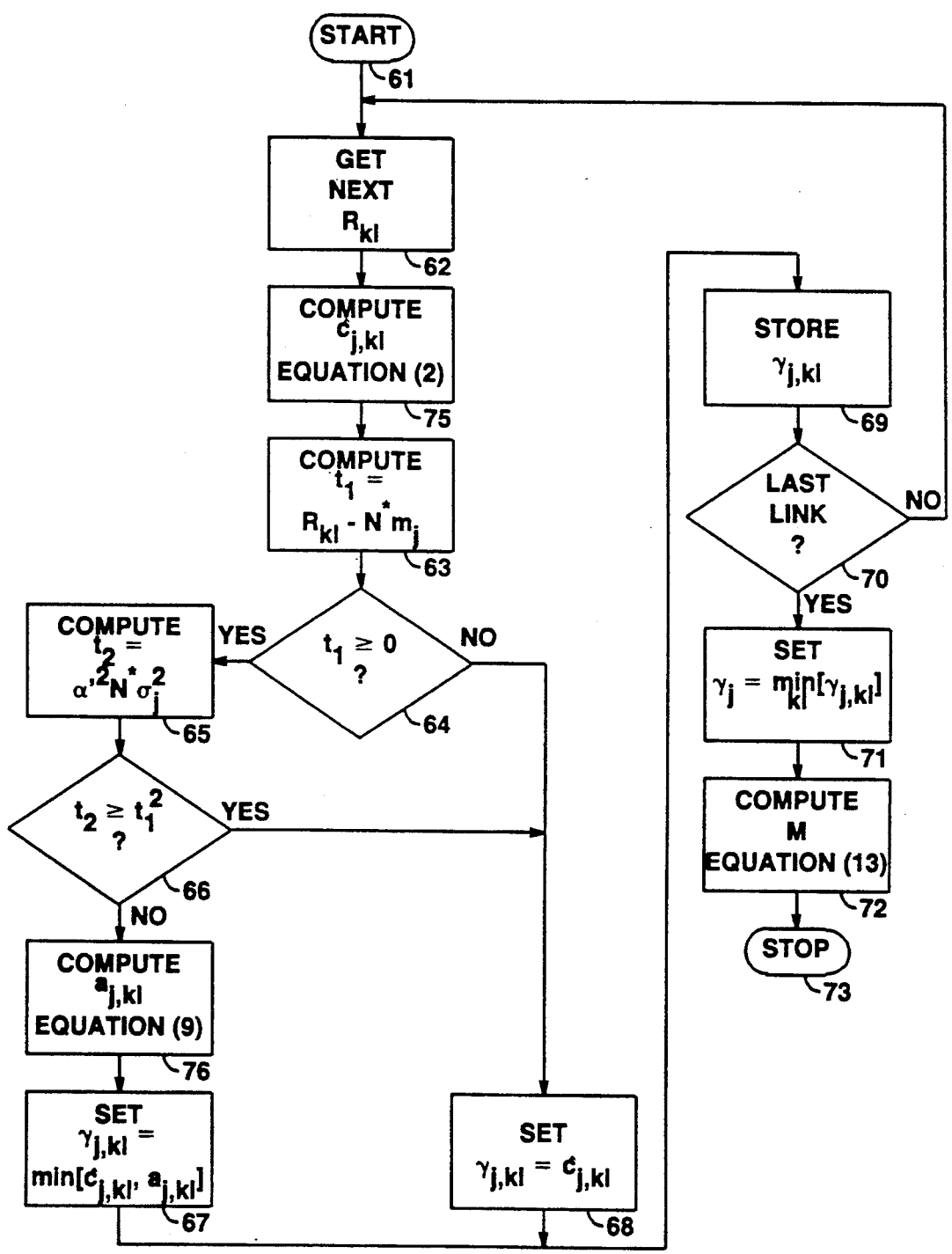
FIG. 6 shows a flow chart of the process for generating the leaky bucket parameters necessary to control access to the network of FIG. 1 at the entry decision point, such as that shown in FIG. 3, in order to prevent congestion in the network due to the input traffic exceeding the predicted values.

In FIG. 6, starting at start box 61, box 62 is entered where the reservable link capacity $R_{kl}$ for the next link in the computed route is retrieved from the topology data base 38 of FIG. 3. In box 75, the equivalent bandwidth capacity $\hat{c}_{j,kl}$ for the new connection is calculated, if not available, or retrieved, if already available from previous calculations. In box 63, the link capacity $R_{kl}$ is used to calculate the first variable $t_1$, using the mean bit rate $m_j$ of the new connection and the heuristically determined minimum number of connections $N^*$ necessary to support the statistical multiplexing assumption. In decision box 64, the value of $t_1$ is tested to determine if it is greater than or equal to zero. If not, box 68 is entered where the estimated value of the token rate $\gamma_{j,kl}$ for this link is set equal to $\hat{c}_{j,kl}$ from equation (2). If the value of $t_1$ is greater than or equal to zero, as determined by decision box 64, box 65 is entered where the second variable $t_2$ is calculated. In decision box 66, the value of $t_2$ is compared to the square of the value of $t_1$. If the value of $t_2$ is equal to or greater than the square of the value of $t_1$, box 68 is again entered where the estimated value of the token rate $\gamma_{j,kl}$ is set equal to $\hat{c}_{j,kl}$ in accordance with equation (2). If the value of $t_2$ is less than the square of the value of $t_1$, as determined by decision box 66, box 76 is entered where the value of $a_{j,kl}$, as given by equation (9), is calculated. Box 67 is then entered where the estimated value of the token rate $\gamma_{j,kl}$ is set equal to minimum of the equivalent bandwidth of the connection for that link, $\hat{c}_{j,kl}$, as given by equation (2), already calculated in box 75, and the value of $a_{j,kl}$ calculated in box 76. In box 69, the estimated value of the token rate for this link, whether determined in box 67 or box 68, is stored for later use. Decision box 70 is then entered to determine if this link was the last link in the calculated route from the source node to the destination node. If this node is not the last node in the route, box 62 is re-entered to get the link capacity value $R_{kl}$ for the next link on the route from data base 38. The estimated token rate for this next link is then calculated in boxes 63 through 68 in the same way already described for the previous link in the route.

When token rate estimates have been calculated for all links in the route and stored in box 69, decision box 70 determines that this was the last link in the route and box 71 is entered. In box 71, the actual token rate to be used is set to be equal to the smallest estimated token rate stored in box 69. Box 72 is then entered to use this actual token rate to calculate the pool size M from equation (13). The process then stops in terminal box 73.

The calculations taking place in the flow chart of FIG. 6 take place in the source node after the new connection route has been calculated and after the connection request message has been launched. Since packets cannot be launched on this new connection until the connection request message has traversed the entire route and has not been rejected by any link in that route, there is more than adequate time to complete the calculations required for the flow chart of FIG. 6 before the first packet needs to be launched on the network. Thereafter, the leaky bucket parameters thus calculated are used to control access of packets from this source to the network to prevent congestion when the packet rate transiently exceeds the precalculated average bit rate. As previously noted, the leaky bucket smooths this traffic and transmits some packets at reduced priority rating to avoid congestion.

If the actual maximum rate at which packets are injected into the network is $\beta$, and $\beta < R$, the leaky bucket will further smooth the input traffic and thereby change the source traffic characteristics. Equations (11) and (12) can still be used to determine the leaky bucket parameters $\gamma$ and M, but the input parameters (R, b, $\rho$) are modified to (R', b', $\rho'$) where, for example, $$R' = \beta, \rho' = \rho \frac{R}{\beta} \quad (14)$$

and $$b' = b \times \frac{R}{\beta} \times \frac{1-\rho}{1-\rho'}.$$

The new parameters of equations (14) can be used to compute, using equations (12) and (13), values for the parameters $\gamma$ and M of the leaky bucket that reflect the modified characteristics of the source.

The modifications to FIG. 6 necessary to accommodate the redefinitions of equation (14) are obvious and will not be further considered here. The leaky bucket parameters can be recalculated at any time that the statistical properties of the input signal changes significantly and it is necessary to renegotiate the calculated route with the links of the network. Needless to say, when a connection is to be removed from the network, the leaky bucket parameters are no longer needed and the connection termination request can be sent along the route to delete the bandwidth reservations for that connection.

It can be seen that the new connection metric vector defined herein can be used both to update the link metric vectors for all links along the path of a new connection and, at the same time, be used to calculate the leaky bucket parameters for controlling the access of the new connection to the network. Moreover, since these connection level controls and the packet level controls are based upon the same metrics for each connection, they are compatible and operate cooperatively to regulate the traffic on the network and avoid congestion regardless of the transient behavior of the signal sources connected to the network.

It should be clear to those skilled in the art that further embodiments of the present invention may be made by those skilled in the art without departing from the teachings of the present invention.

What is claimed is:

1. A packet communications network including a plurality of switching nodes interconnected by transmission links, and in which data packets are transmitted over multilink paths between a source node and a destination node, said packet communications network comprising
   means for storing, at each said node, a representation of the traffic load reserved for all connections on each transmission link terminating in said node, said representation comprising a vector including the mean of the bit rate for all of said connections, the variance of said bit rate around said mean bit rate, and the sum of the equivalent bandwidths required to carry said connections if each said connection were offered in isolation,
   said equivalent bandwidth of a connection having a first value when the number of connections sharing one of said transmission links exceeds a predetermined value and having a second different value when said number of connections does not exceed said predetermined value, where said predetermined value is equal to or greater than ten.
   means for initiating a new connection in said network by propagating a connection request along the route selected for that connection, said connection request including a vector representing the mean, variance and equivalent bandwidth of said new connection,
   means responsive to said connection request for updating said representations of traffic load by vector addition at each of said nodes along said route.

2. The packet communications network according to claim 1 further comprising
   means responsive to said connection request for denying said connection request when the updated representation of the traffic load on any of said transmission links exceeds the capacity of said transmission link.

3. The packet communications network according to claim 1 wherein said means for updating said representations of traffic load comprises
   means for determining the value $t_1$ of a first variable given by $$t_1 = R_{kl} - N^* m_j$$

where $R_{kl}$ is the maximum reservable traffic capacity on link kl, $N^*$ is a constant, and $m_j$ is the mean of the bit rate for said new connection,
   means for comparing the value of said first variable to zero and, if said value is greater than zero, determining the value $t_2$ of a second variable given by $$t_2 = a'^2 N^* \sigma_j^2$$

where $\sigma_j$ is the standard deviation of the mean bit rate $m_j$, and $a'$ is given by $$a' \approx \sqrt{2 \ln \frac{1}{\epsilon} - \ln 2\pi}$$

means for comparing the value of said second variable to the square of said first variable,
   means for determining an update vector $\bar{r}_j$ in which the variance of the bit rate is zero,
   means for updating said representation with said request vector when said first variable is greater than zero and said second variable is less than the square of said first variable, and means for updating said representation with said update vector $\bar{r}_j$ otherwise.

4. The packet communications network according to claim 1 further comprising means utilizing said representations for determining the token rate and pool size of a leaky bucket mechanism to control the access of said packets to said network.

5. The packet communications network according to claim 4 further comprising means for estimating the bandwidth required for carrying said new connection on each link of said route, means for selecting the minimum estimated bandwidth for carrying said new connection on said links of said route as the token rate of said leaky bucket mechanism, and means for determining the pool size of said leaky bucket mechanism to reduce the probability of delaying a packet by said leaky bucket mechanism below some preselected value.

6. The packet communications network according to claim 5 wherein said token rate is given by $$\gamma_j = \min_{kl}\{\gamma_{j,kl}\} \qquad (12)$$

where $$\gamma_{j,kl} = \begin{cases} \min\{\hat{c}_{j,kl}, a_{j,kl}\} & \text{if } N_{j,kl} > N^* \\ \hat{c}_{j,kl} & \text{otherwise} \end{cases}$$

and wherein said pool size is given by $$M = \frac{b(1-\rho)\gamma(R-\gamma)}{\gamma - \rho R} \times \ln\left(\frac{\rho(\gamma - \rho R) + \rho\xi(R-\gamma)}{\xi\gamma(1-\rho)}\right).$$

7. A method for establishing new connections in a packet communications network including a plurality of switching nodes interconnected by transmission links, and in which data packets are transmitted over multilink paths between a source node and a destination node, said method comprising the steps of storing, at each said node, a representation of the traffic load reserved for all connections on each transmission link terminating in said node, said representation comprising a vector including the means of the bit rate for all of said connections, the variance of said bit rate around said mean bit rate, and the sum of the equivalent bandwidths required to carry said connections if each said connection were offered in isolation, said equivalent bandwidth of a connection having a first value when the number of connections sharing one of said transmission links exceeds a predetermined value and having a second different value when said number of connections does not exceed said predetermined value, where said predetermined value is equal to or greater than ten, initiating a new connection in said network by propagating a connection request along the route selected for that connection, said connection request including a vector representing the mean, variance and equivalent bandwidth of said new connection, and updating, in response to said connection request, said representations of traffic load by vector addition at each of said nodes along said route.

8. The method according to claim 7 further comprising the step of denying, in response to said connection request, said connection request when the updated representation of the traffic load on any of said transmission links exceeds the capacity of said transmission link.

9. The method according to claim 7 wherein said step of updating said representations of traffic load comprises determining the value $t_1$ of a first variable given by $$t_1 = R_{kl} - N^* m_j$$

where $R_{kl}$ is the maximum reservable traffic capacity on link kl, $N^*$ is a constant, and $m_j$ is the mean of the bit rate for said new connection, comparing the value of said first variable to zero and, if said value is greater than zero, determining the value $t_2$ of a second variable given by $$t_2 = \alpha'^2 N^* \sigma_j^2$$

where $\sigma_j$ is the standard deviation of the mean bit rate $m_j$, and $\alpha'$ is given by $$\alpha' \approx \sqrt{2 \ln \frac{1}{\epsilon} - \ln 2\pi}$$

comparing the value of said second variable to the square of said first variable, determining an update vector $r_j$ in which the variance of the bit rate is zero, updating said representation with said request vector when said first variable is greater than zero and said second variable is less than the square of said first variable, and updating said representation with said update vector $\bar{r}_j$ otherwise.

10. The method according to claim 7 further comprising the step of utilizing said representations for determining the token rate and pool size of a leaky bucket mechanism to control the access of said packets to said network.

11. The method according to claim 10 further comprising the steps of estimating the bandwidth required for carrying said new connection on each link of said route, selecting the minimum estimated bandwidth for carrying said new connection on said links of said route as the token rate of said leaky bucket mechanism, and determining the pool size of said leaky bucket mechanism to reduce the probability of delaying a packet by said leaky bucket mechanism below some preselected value.

12. The method according to claim 11 wherein including the steps of calculating said token rate $\gamma_j$ from $$\gamma_j = \min_{kl}\{\gamma_{j,kl}\} \quad (12)$$

where $$\gamma_{j,kl} = \begin{cases} \min\{c_{j,kl}, a_{j,kl}\} & \text{if } N_{j,kl} > N^* \\ c_{j,kl} & \text{otherwise} \end{cases}$$

and calculating said pool size M from $$M = \frac{b(1-\rho)\gamma(R-\gamma)}{\gamma - \rho R} \times \ln\left(\frac{\rho(\gamma - \rho R) + \rho\xi(R-\gamma)}{\xi\gamma(1-\rho)}\right).$$

13. A node for a packet communications network including a plurality of switching nodes interconnected by transmission links, and in which data packets are transmitted over multilink paths between a source node and a destination node, said packet communications network node comprising means for storing at said node a representation of the traffic load reserved for all connections on each transmission link terminating in said node, said representation comprising a vector including the mean of the bit rate for all of said connections, the variance of said bit rate around said mean bit rate, and the sum of the equivalent bandwidths required to carry said connections if each said connection were offered in isolation, said equivalent bandwidth of a connection having a first value when the number of connections sharing one of said transmission links exceeds a predetermined value and having a second different value when said number of connections does not exceed said predetermined value, where said predetermined value is equal to or greater than ten, means for initiating a new connection in said network by propagating a connection request from said node along the route selected for that connection, said connection request including a vector representing the mean, variance and equivalent bandwidth of said new connection, and means in said node responsive to a connection request from other nodes in said network for updating said representation of traffic load by vector addition at said node.

14. The packet communications network node according to claim 13 further comprising means responsive to said connection request for denying said connection request when the updated representation of the traffic load on a transmission link in said route exceeds the capacity of said transmission link.

15. The packet communications network node according to claim 13 wherein said means for updating said representations of traffic load comprises means for determining the value $t_1$ of a first variable given by $$t_1 = R_{kl} - N^* m_j$$

where $R_{kl}$ is the maximum reservable traffic capacity on link kl, $N^*$ is a constant, and $m_j$ is the mean of the bit rate for said new connection, means for comparing the value of said first variable to zero and, if said value is greater than zero, determining the value $t_2$ of a second variable given by $$t_2 = \alpha'^2 N^* \sigma_j^2$$

where $\sigma_j$ is the standard deviation of the mean bit rate $m_j$, and $\alpha'$ is given by $$\alpha' \approx \sqrt{2\ln(1/\epsilon) - \ln 2\pi}$$

means for comparing the value of said second variable to the square of said first variable, means for determining an update vector $r_j$ in which the variance of the bit rate is zero, means for updating said representation with said request vector when said first variable is greater than zero and said second variable is less than the square of said first variable, and means for updating said representation with said update vector $r_j$ otherwise.

16. The packet communications network node according to claim 13 further comprising means utilizing said representations for determining the token rate and pool size of a leaky bucket mechanism to control the access of said packets to said network at said node.

17. The packet communications network node according to claim 13 further comprising means at said node for estimating the bandwidth required for carrying said new connection on each link of said route, means at said node for selecting the minimum estimated bandwidth for carrying said new connection on said links of said route as the token rate of said leaky bucket mechanism, and means at said node for determining the pool size of said leaky bucket mechanism to reduce the probability of delaying a packet by said leaky bucket mechanism below some preselected value.

18. The packet communications network node according to claim 17 wherein said token rate is given by $$\gamma_j = \min_{kl}\{\gamma_{j,kl}\} \quad (12)$$

where $$\gamma_{j,kl} = \begin{cases} \min\{c_{j,kl}, a_{j,kl}\} & \text{if } N_{j,kl} > N^* \\ c_{j,kl} & \text{otherwise} \end{cases}$$

and wherein said pool size is given by $$M = \frac{b(1-\rho)\gamma(R-\gamma)}{\gamma - \rho R} \times \ln\left(\frac{\rho(\gamma - \rho R) + \rho\xi(R-\gamma)}{\xi\gamma(1-\rho)}\right).$$

* * * * *